(12) United States Patent
Gonzales, II (10) Patent No.: US 8,037,357 B2
(45) Date of Patent: Oct. 11, 2011

(54) SYSTEM AND METHOD FOR GENERATING TEST JOB CONTROL LANGUAGE FILES

(75) Inventor: Jesus Orlando Gonzales, II, Foster City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 212 days.

(21) Appl. No.: 12/410,190

(22) Filed: Mar. 24, 2009

(65) Prior Publication Data

US 2010/0251024 A1 Sep. 30, 2010

(51) Int. Cl.
*G06F 11/00* (2006.01)
(52) U.S. Cl. .......................................... 714/33; 714/37
(58) Field of Classification Search .................. 714/33, 714/37, 40, 45
See application file for complete search history.

(56) References Cited

U.S. PATENT DOCUMENTS

| | | | | |
|---|---|---|---|---|
| 6,430,708 B1* | 8/2002 | Evans | | 714/38 |
| 7,237,210 B2* | 6/2007 | Likovich et al. | | 716/104 |
| 7,240,243 B2* | 7/2007 | Decker | | 714/33 |
| 7,386,763 B2* | 6/2008 | Sathe | | 714/43 |
| 7,506,281 B1* | 3/2009 | Secatch | | 716/136 |
| 7,590,894 B2* | 9/2009 | Swoboda et al. | | 714/45 |
| 7,822,780 B1* | 10/2010 | Meinsen et al. | | 707/802 |
| 2003/0159087 A1* | 8/2003 | Grieskamp et al. | | 714/37 |
| 2004/0216013 A1* | 10/2004 | Sun | | 714/45 |
| 2005/0283667 A1* | 12/2005 | Batten et al. | | 714/25 |
| 2006/0085682 A1* | 4/2006 | Tada et al. | | 714/33 |
| 2008/0195906 A1* | 8/2008 | Otaka et al. | | 714/738 |
| 2010/0218168 A1* | 8/2010 | Gonzales, II | | 717/125 |
| 2010/0242024 A1* | 9/2010 | Gonzales, II | | 717/125 |
| 2010/0251024 A1* | 9/2010 | Gonzales, II | | 714/32 |
| 2010/0251246 A1* | 9/2010 | Gonzales, II | | 718/102 |

\* cited by examiner

*Primary Examiner* — Joshua Lohn
(74) *Attorney, Agent, or Firm* — Chadbourne & Parke LLP; Walter G. Hanchuk (57) ABSTRACT

A software testing system for generating a test job control language (JCL) file is provided. The system includes a processor, a memory device for storing a source JCL file containing jobs and an instruction file containing instructions for modifying the source JCL file according to a test environment. A JCL generation module executed by the processor determines all procedures that are referenced by the jobs in the source JCL file, opens each unique procedure of the determined procedures once and modifies the jobs in the source JCL file based on the instruction file and the opened procedures to generate the test JCL file. By opening each procedure only once which may be called multiple times in the jobs, the JCL generation module substantially increases the speed of generating the test JCL file.

24 Claims, 9 Drawing Sheets

CTEJBOVR>Q##T
    CTESTSAR>Y
    CTERNEWD>Y
    CTEONFLW>N
    CTEJOBNM>N
    CTERPENV>N
    GLDSOVER>F>VLM.C1B2ONL.PRODLOAD
    GLDSOVER>U>DSN=VLM.C1B2.PRODLOAD
    GLDSOVER>F>PAR.BK.PLUSGATE.TRANGATE.PRECONV(+1)
    GLDSOVER>U>DSN=DAR.TREG.BK.PLUSGATE.TRANGATE.PRCNV(+1)
    GLDSOVER>F>PAR.FM.PLUSGATE.TRANGATE.PRECONV(+1)
    GLDSOVER>U>DSN=DAR.TREG.FM.PLUSGATE.TRANGATE.PRCNV(+1)
502 GLDSOVER>F>TBR.PROD.CF.CNFG.OFFLINE
    GLDSOVER>U>DSN=DBA.TREG.CF.CNFG.ONLINE.D070724
    GLDSOVER>F>PBA.CF.CNFG.ONLINE
    GLDSOVER>U>DSN=DBA.TREG.CF.CNFG.ONLINE.D070724
    GLDSOVER>F>PBA.CF.CNFG.OFFLINE
    GLDSOVER>U>DSN=DBA.TREG.CF.CNFG.ONLINE.D070724
    GLDSOVER>F>PBAV.CF.CNFG.ONLINE
    GLDSOVER>U>DSN=DBA.TREG.CF.CNFG.ONLINE.D070724
    GLDSOVER>F>PBAV.CF.CNFG.OFFLINE
    GLDSOVER>U>DSN=DBA.TREG.CF.CNFG.ONLINE.D070724
    GLDSOVER>F>PBR.CF.CNFG.ONLINE
    GLDSOVER>U>DSN=DBA.TREG.CF.CNFG.ONLINE.D070724
    GLDSOVER>F>PBR.CF.CNFG.OFFLINE
    GLDSOVER>U>DSN=DBA.TREG.CF.CNFG.ONLINE.D070724
    GLDSOVER>F>PBRV.CF.CNFG.ONLINE
    GLDSOVER>U>DSN=DBA.TREG.CF.CNFG.ONLINE.D070724
    GLDSOVER>F>PBRV.CF.CNFG.OFFLINE
    GLDSOVER>U>DSN=DBA.TREG.CF.CNFG.ONLINE.D070724
    GLDSOVER>F>PBA.CF.MVVCNFG.ONLINE
    GLDSOVER>U>DSN=TBA.PROD.CF.MVVCNFG.ONLINE
    GLDSOVER>F>PBAV.CF.MVVCNFG.ONLINE
    GLDSOVER>U>DSN=TBA.PROD.CF.MVVCNFG.ONLINE

F I G. 5

602

```
604  DDOV>PBA //DELETE.SYSIN DD DSN=DPA.TREG.JOTT.TESTPARM.BRP(&DELPARM)
     DDOV>PBA //DEFINE.SYSIN DD DSN=DPA.TREG.JOTT.TESTPARM.BRP(&DEFPARM)
606  DDOV>PBR //DELETE.SYSIN DD DSN=DPA.TREG.JOTT.TESTPARM.BRP(&DELPARM)
     DDOV>PBR //DEFINE.SYSIN DD DSN=DPA.TREG.JOTT.TESTPARM.BRP(&DEFPARM)
     DDOV>PCL //DELETE.SYSIN DD DSN=DPA.TREG.JOTT.TESTPARM.BRP(&DELPARM)
     DDOV>PCL //DEFINE.SYSIN DD DSN=DPA.TREG.JOTT.TESTPARM.BRP(&DEFPARM)
     DDOV>PPA //DELETE.SYSIN DD DSN=DPA.TREG.JOTT.TESTPARM.BRP(&DELPARM)
     DDOV>PPA //DEFINE.SYSIN DD DSN=DPA.TREG.JOTT.TESTPARM.BRP(&DEFPARM)
     DDOV>PSE //DELETE.SYSIN DD DSN=DPA.TREG.JOTT.TESTPARM.BRP(&DELPARM)
     DDOV>PSE //DEFINE.SYSIN DD DSN=DPA.TREG.JOTT.TESTPARM.BRP(&DEFPARM)
     DDOV>PVS //DELETE.SYSIN DD DSN=DPA.TREG.JOTT.TESTPARM.BRP(&DELPARM)
     DDOV>PVS //DEFINE.SYSIN DD DSN=DPA.TREG.JOTT.TESTPARM.BRP(&DEFPARM)
     PCPM>BCA  >APL=DPA.TREG
     PCPM>RSI  >APL=DPA.TREG
     PCPM>APF  >APL=DPA.TREG
     PCPM>SMA  >APL=DPA.TREG
     PCPM>VSS  >APL=DPA.TREG
     JBED>CLASS=G
```

```
//PPARWARM   JOB    (0415,PA00), 'PROD CONTROL'
//                  CLASS=R,           ⎫
//                  MSGCLASS=J,        ⎪
//                  TIME=MAXIMUM,      ⎬ 803
//                  REGION=500M        ⎭
//
//
//JOBLIB     DD DSN=VLM.C1PA.PRODLOAD.DISP=SHR
//*                                                   804
//PROCS JCLLIB      ORDER=(VLM.C1PA.PRODPROC)
//                              806
//PADCOLD   EXEC    PADCOLD,
//                  TYPE=WARM,         ⎫
//                  VIC=EA,            ⎪
//                  SUBN2=AP,          ⎬ 807
//                  SYSTEM=PASYSTEM    ⎭
//*
//
//DSTOR06P  DD      DSN=PPA.AP.DSTORE06,DISP=SHR
//DSTOR06S  DD      DSN=PPA.AP.DSTORE6X,DISP=SHR
//*
//DSTOR07P  DD      DSN=PPA.AP.DSTORE07,DISP=SHR
//DSTOR07S  DD      DSN=PPA.AP.DSTORE7X,DISP=SHR
//
//DSTOR08P  DD      DSN=PPA.AP.DSTORE08,DISP=SHR
//DSTOR08S  DD      DSN=PPA.AP.DSTORE8X,DISP=SHR
```

FIG. 8

```
//QPABWARM  JOB      (R807624,99999), 'CTE 070709'
//                   CLASS=J,
//                   MSGCLASS=J,
//                   TIME=MAXIMUM,          ⎫
//                   REGION=500M            ⎬ 903
//                   NOTIFY=&SYSUID         ⎭
//
//                   JCL GENERATED BY CTEJCL v1.19
//SAR OUTPUT JESDS=ALL, CLASS=J SEND A COPY TO SAR
//HOLD     OUTPUT JESDS=ALL, CLASS=X KEEP A COPY TO SDSF
//
//JOBLIB    DD       DSN=VLM.C1PA.VQ03LOAD,DISP=SHR
//          DD       DSN=VLM.C1PA.STGLOAD,DISP=SHR
//          DD       DSN=VLM.C1PA.PRODLOAD,DISP=SHR
//
//PROCS JCLLIB       ORDER=(VLM.C1PA.TECHSUPP.VQ03PROC,
//                   VLM.C1PA.STGPROC, VLM.C1PA.PRODPROC)
//
//PADCOLD            EXEC  PADCOLD,──── 906
//                   TYPE=WARM,             ⎫
//                   VIC=OV,                │
//                   SUBN2=AP,              ⎬ 907
//                   SYSTEM=PBREGQA         │
//                   PPA = DPA.BREG,        │
//                   PBR = DBR.BREG         ⎭
```

F I G. 9

SYSTEM AND METHOD FOR GENERATING TEST JOB CONTROL LANGUAGE FILES

FIELD OF THE INVENTION

The present invention relates to generating jobs in a computing environment, and more particularly a system and method for generating test job control language (JCL) files in test bed computing environments.

BACKGROUND OF THE INVENTION

Making modifications or enhancements to software running in a live computer system requires careful testing and deployment, especially if the system is a large transaction processing system such as VisaNet™, which processes over one hundred million financial transactions (e.g., credit card transactions) per day. Typically, a set of software modification projects are initially tested in a test environment which emulates the actual transaction processing system.

The test environment is typically simulated on a mainframe computer system using program instructions and parameters encoded in JCL (Job Control Language). In JCL, a program unit for executing a particular task is referred to as a 'job'. A job may reference and call various procedures (procs) which perform specific operations and the procs call executable modules or programs. A number of jobs are generally executed in a sequence to test a scenario in the test environment.

Figure 1:
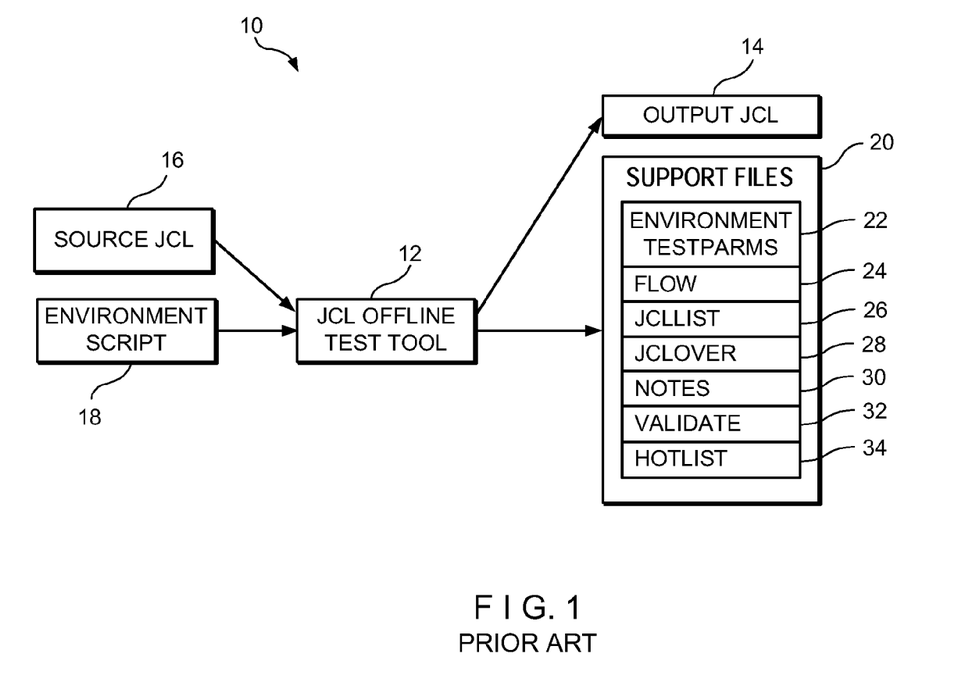
FIG. 1 illustrates a system for generating JCLs in the prior art.
Figure 8:
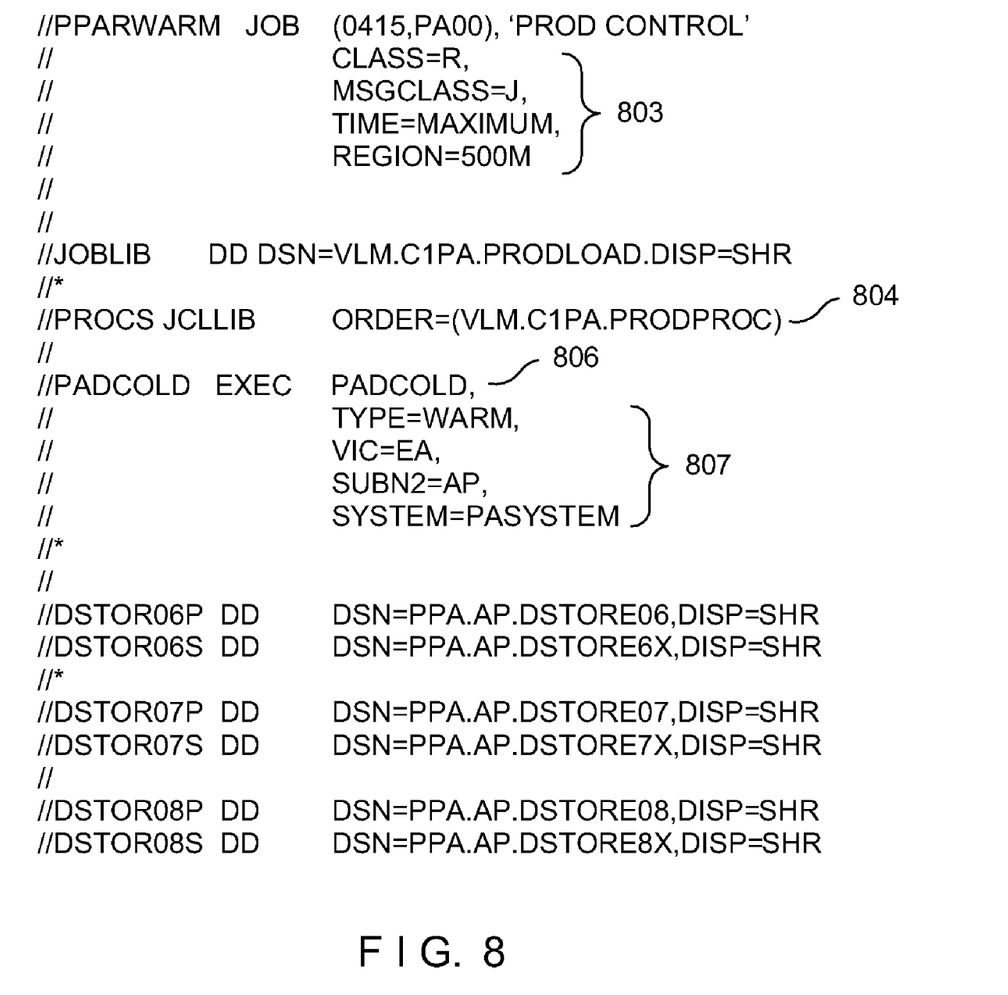
FIG. 8 shows a portion of an exemplary source JCL file according to an embodiment of the present invention.

As shown in FIG. 1, one known system 10 in the prior art employs a JCL offline test tool (JOTT) 12 which generates an output JCL file 14 including one or more jobs for use in a test environment. The program JOTT 12 is discussed more fully in U.S. Pat. No. 6,430,708, issued on Aug. 6, 2002, which is incorporated herein by reference. The output JCL file 14 is generated based on an input source JCL file 16 and an environment code file ('script') 18. The environment script 18 is used to configure the environment in which the output JCL 14 operates. The environment script 18 includes lines of code that specify variables for which values are not yet set, and overrides which change the names of certain variables. A portion of an exemplary source JCL is shown in FIG. 8. The portion of the source JCL file shown includes, among other items, a job reference (first line), associated variables 803, a procedure library reference 804, and a procedure call 806 including associated variables 807.

In addition to generating the output JCL file 14, JOTT 12 also generates support files 20 such as an environment test parameters file 22 that specifies operating parameters of the environment, a FLOW file 24 which lists jobs generated in an order in which they should be submitted for execution in the environment, a JCLLIST file 26 which lists environment details such as various overrides and jobname overlays for changing job names, a JCLOVER file 28 with a collection of most of the specific override instructions pertaining to the JCL 14, a NOTES file 30 for listing text notes such as error messages, a VALIDATE file 32 listing a date of validation of the JCL 14, and a HOTLIST file 34 listing a collection of specific override instructions such as dataset name overrides.

In such prior art systems, the numerous support files 22-34 do not provide any clear definition of where global changes have been made in generating the output JCLs 14 based on a specific environment script file 18. That is, a library of different source JCLs 16 may be the basis of a library of output JCLs 14 adapted to a specific environment, and global changes, such as overrides, may be applied to entire source library 16 to generate a library of output JCLs 14. Although the support files 20-34 may indicate specific overrides, none of the support files 20-34 in the prior art provide a clear indication of global overrides spanning the library of source JCLs 14 in a common JCL library for an environment.

It would be desirable for a JCL generating module to indicate global aspects of JCLs generated and operating in a common environment.

In addition, such prior art systems including JOTT 12 utilize expensive and complex utilities, which hinder effective generation of output JCLs 14 in test environments. For example, in the prior art systems 10 using JOTT 12, the generation of the output JCL 14 is performed inefficiently, as follows.

Figure 2:
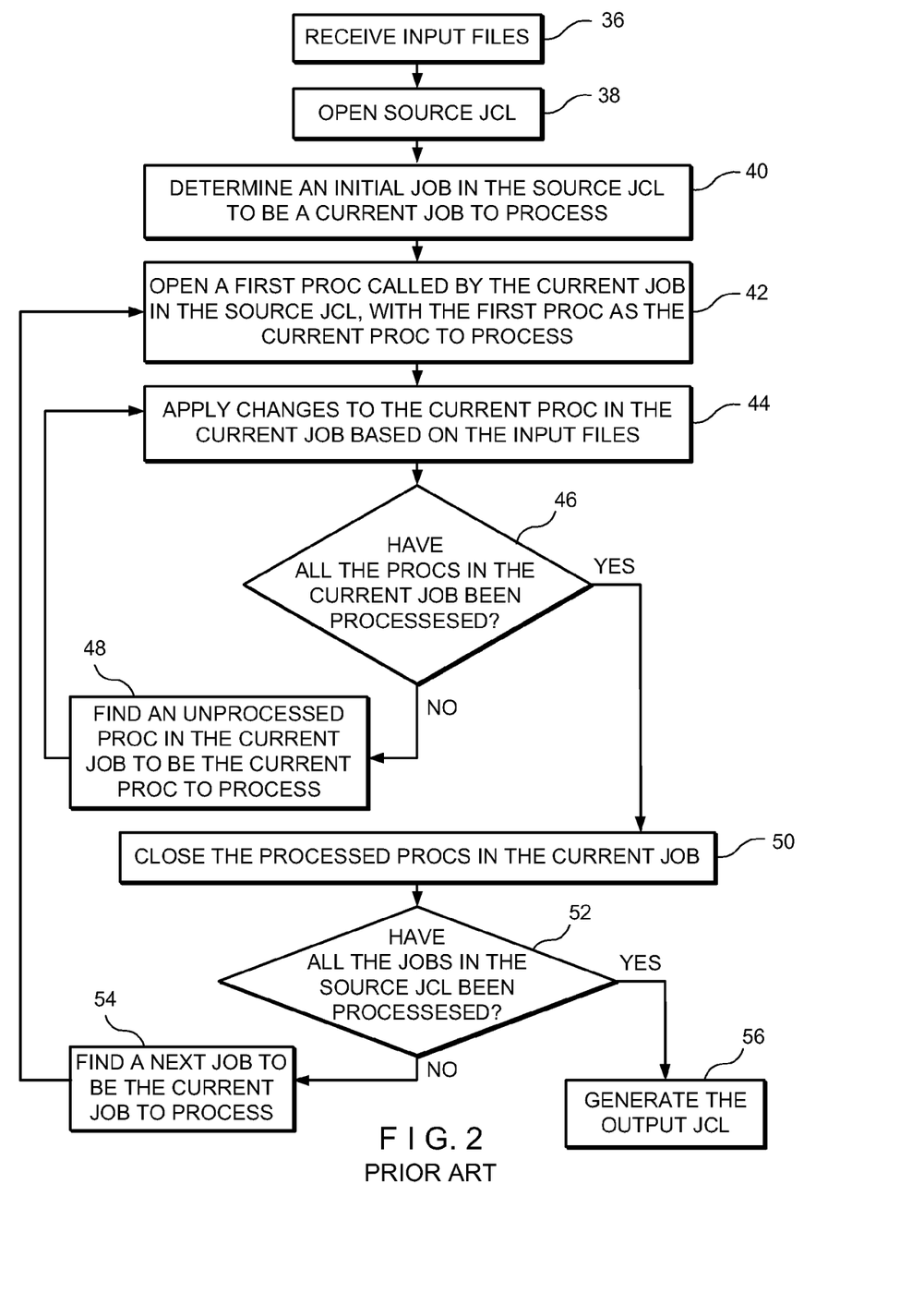
FIG. 2 illustrates a method for generating JCLs in the prior art using the system of FIG. 1.

In the process of generating output JCL file 14, the system 10 operates according to the method shown in FIG. 2, in which JOTT 12 receives the input files 16,18 in step 36, opens the source JCL file 16 in step 38, and determines in step 40 an initial job listed in the source JCL file 16 to be a current job to process. Each source JCL file 16 lists one or more procs to be called and performed on a line-by-line basis.

The prior art method (of FIG. 2) opens a first proc called by the current job in the source JCL file in step 42, with the first proc as the current proc to process. In "opening" the proc, the prior art system reads and determines the source proc, such as the library and path for accessing the proc. The step of opening a procedure or proc involves opening a new variable for the output JCL file 14 which is to be named and loaded with data, such as a proc name to be used by the output JCL 14 in the environment. JOTT 12 then applies changes to the current proc in the current job in step 44 based on the input files, such as the environment script file 18, by filling in the opened variable. The method then determines in step 46 if all of the procs in the current job have been processed. If not, the method then finds the next unprocessed proc in the current job in step 48 to process, and loops back to perform steps 44-46 to iteratively process every single proc until all procs in the current job have been processed in step 46.

The method then proceeds to step 50 to close the processed procs in the current job, for example, by saving the record of the variables or modified procs being generated in the output JCL 14. In step 52 it is determined if all of the jobs in the source JCL 16 file have been processed. If not, the method finds a next job in the source JCL 16 in step 54 to be the next current job to process, and loops back to perform steps 42-52 to iteratively process every single job and every single proc, until all procs in all of the jobs of the source JCL 16 have been processed in step 46.

In the above described method, procs processed in an earlier job may be identical to procs processed in a later job, and the same procs are reopened every time they are encountered in a current job. New variables and new values are repeatedly generated for each proc until the final output JCL is generated in step 56, regardless of earlier-performed operations.

Each time a proc is opened, there is an incremental processing time for the opening process. Although JOTT 12 and such test environments are operating on relatively fast computer systems, over any length of time, the incremental processing time involved in each opening process accumulates to become noticeable delays in processing which slows the generation of the output JCL file 14. For projects implementing changes in hundreds or thousands of JCLs in multiple environments, such repeated opening and closing of procs result in significant delays in testing and implementing new software in test environments and, ultimately, delays full implementation in real-world environments, for example, in transaction processing systems.

It would therefore be desirable to avoid such delays, and provide an improved method and system for generating output test JCL files through greater efficiency in the processing of jobs and procs in JCL generation.

SUMMARY OF THE DISCLOSURE

According to one aspect, the present invention provides a system for generating a test job control language (JCL) file that comprises a processor, a memory device for storing a source JCL file containing a plurality of jobs and an instruction file. A JCL generation module executable by the processor is adapted to determine all procedures that are referenced by the plurality of jobs in the stored source JCL file, open each unique procedure of the determined procedures once and modify the plurality of jobs in the source JCL based on the instruction file and the opened procedures to generate the test JCL file.

According to another aspect, the present invention provides a method for generating a test job control language (JCL) file comprising: a) storing a source JCL file including a plurality of jobs and an instruction file containing instructions for modifying the source JCL file according to a test environment, b) determining all procedures that are referenced by the plurality of jobs in the stored source JCL file, c) opening each unique procedure of the determined procedures once, and d) modifying the plurality of jobs in the source JCL based on the instructions in the instruction file and the opened procedures to generate the test JCL file.

DETAILED DESCRIPTION OF THE INVENTION

For purposes of this application, the terms "code", "program", "application", "software code", "software module", "module" and "software program" are used interchangeably to mean software instructions that are executable by a processor.

Figure 3:
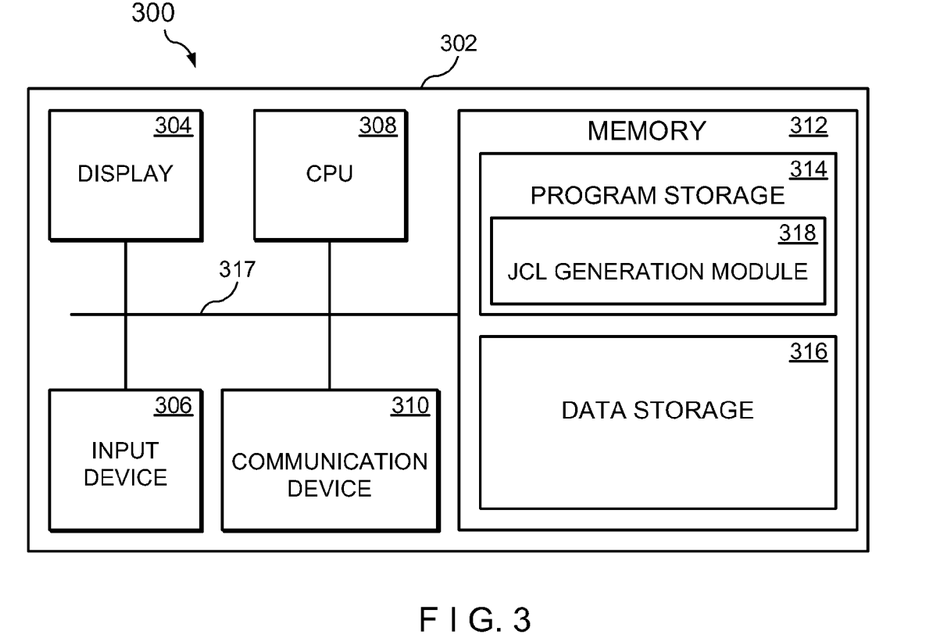
FIG. 3 illustrates an exemplary computer-based system implementing the present invention.

An exemplary block diagram of a computer-based system 300 according to an embodiment of the present invention is shown in FIG. 3. Referring to FIG. 3, the computer-based system 300 includes a tester computer 302 having a display 304 and an input device 306. The computer-based system 300 includes a CPU 308, a communication device 310, and a memory 312, each of which is connected to a program storage unit 314 and a data storage unit 316, via a bus 317. The program storage unit 314 includes a JCL generation module 318 according to the present invention, as described herein. The computer-based system 300 may be a mainframe computer and/or a network of computing environments for interacting with the tester computer 302, which may be a terminal of the mainframe computer or network.

The JCL generation module 318 of computer system 300 generates JCLs that are modified so as to meet the requirements of a particular testing scenario. For example, if a certain library of jobs LIB1 was previously created or modified to meet the requirement of a first testing scenario, SCENARIO 1, and a tester now wishes to test computer system according to another scenario, SCENARIO 2, the JCLs in LIB1 are modified according to the requirements of SCENARIO 2.

The computer-based system 300 allows the tester to specify a script or global file to be processed by the computer-based system 300. If the tester selects and specifies a script, the computer-based system 300 calls a program, referred to as 'GENPARM' which generates one or more instruction files 406 (shown in FIG. 4). In the embodiment shown, GENPARM generates the following instruction files: GLOBAL file 410, SPECIFIC file 412, and FLOW file (not shown) similar to that in FIG. 1. GENPARM also generates environment's test parameters file (not shown) similar to that in FIG. 1. These instruction files 406 are generated based on testing information (e.g., a script file) such that the instruction files are configured to enable a particular testing scenario.

Figure 4:
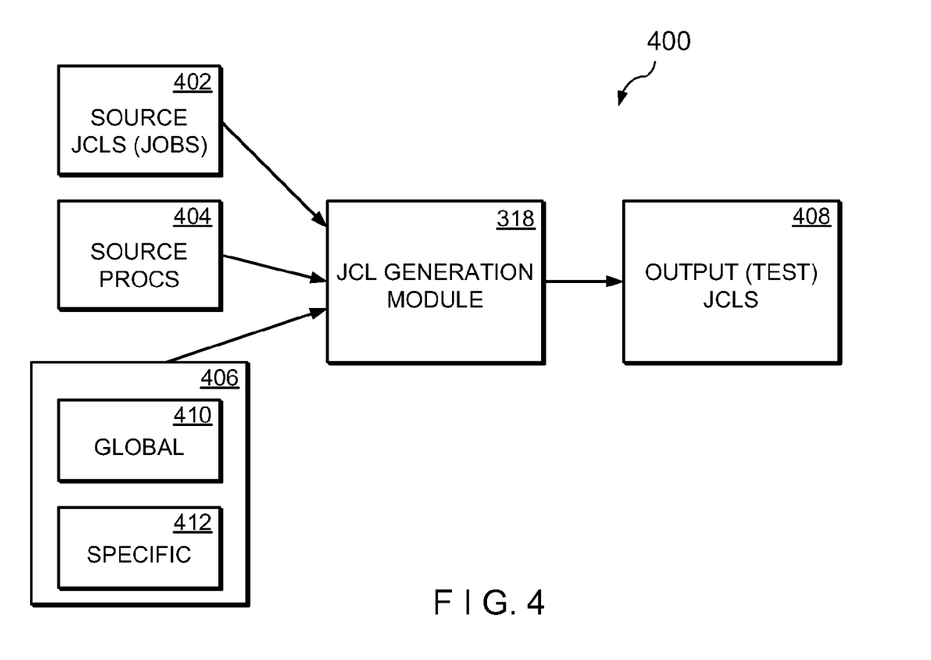
FIG. 4 is a block diagram showing a system for generating a test JCL file according to an embodiment of the present invention.

Referring now to FIG. 4, which shows a system 400 for generating test JCLs according to the present invention, a source JCL file 402, a source proc file 404 and the instruction files 406 are input to JCL generation module 318. The source JCL file 402 contains the JCLs that are used or that will be used in a live production system which are to be modified according to the requirements of a test scenario, and source proc file 404 includes a library of procs accessible by the jobs of source JCL file 402. The instruction files 406 include instructions for modifying source JCL file 402 into an output test JCL file 408 configured for a particular test scenario. In the embodiment shown, as discussed earlier, the instruction files 406 include a GLOBAL file 410 and a SPECIFIC file 412. GLOBAL file 410 includes modifications, such as reference changes (overrides), which apply to all of the jobs and/or data sets in the source JCL file 402.

Figure 5:
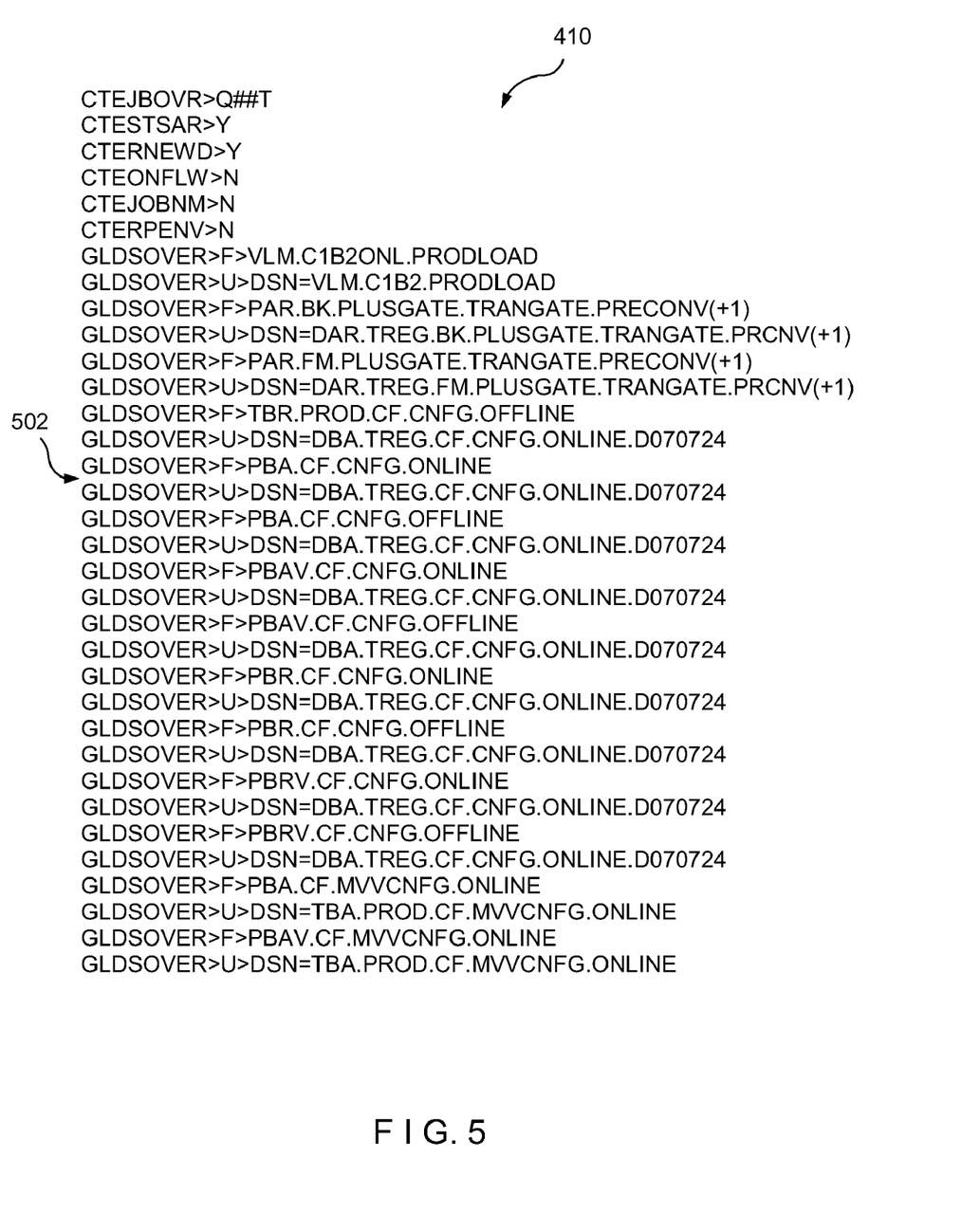
FIG. 5 shows a portion of an example GLOBAL instruction file according to an embodiment of the present invention.

A portion of an example GLOBAL file 410 is shown in FIG. 5. One example instruction of GLOBAL file 410 shown in FIG. 5 is an 'override' instruction used to replace a reference (e.g., a file name) with a substitute reference. In particular, instruction 502 is a FOR:USE instruction which replaces every instance of data set name:"TBR.PROD.CF.CONFIG.OFFLINE" throughout the source JCL file 402 with data set name "DBA.TREG.CF.CNFG.ONLINE.D070724". By changing name references, different files may be accessed that contain data and instructions appropriate for the selected test scenario. The GLOBAL file 410 also includes a list of all jobs (not shown) contained in the source JCL file 402.

Figure 6:
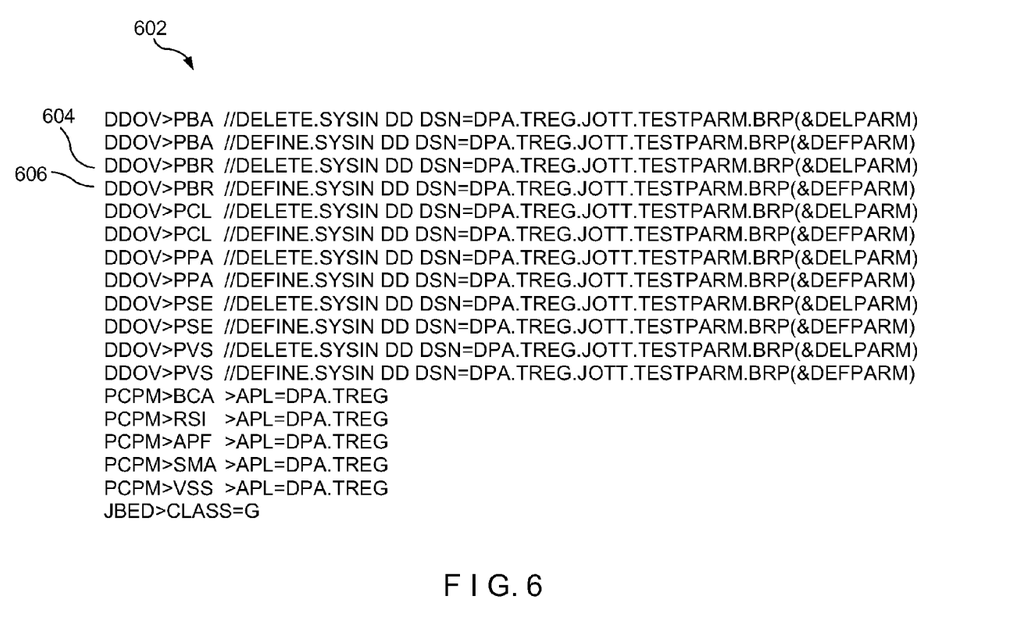
FIG. 6 shows a portion of an example SPECIFIC instruction file according to an embodiment of the present invention.

SPECIFIC file 412 includes modifications for one selected job of the source JCL file 402. A member of an example SPECIFIC file 412 is shown in FIG. 6. The member 602 includes instructions pertaining to a particular job. Other members of SPECIFIC file 412 (not shown) pertain to other jobs of source JCL file 402. In the example shown, instructions 604 and 606 are data definition override (DDOV) instructions pertaining to a proc named 'PBR'. Instruction 604 is used to delete a definition of a data set name "DPA.TREG.JOTT.TESTPARM.BRP(&DELPARM)"

included in proc PBR while the following instruction 606 defines a data set name "DPA.TREG.JOTT.TEST-PARM.BRP(&DEFPARM)". When GLOBAL file 410 and SPECIFIC file 412 have conflicting instructions that apply to the same JCL code of source JCL file 401, the instructions in SPECIFIC file 412 supersede or override the instructions in GLOBAL file 410 for the jobs to which they apply. Additionally, if SPECIFIC file 412 includes a member corresponding to a particular job in source JCL file 402, the member may include a reference to the JCL library where the source JCL file is located. Otherwise, if SPECIFIC file 412 does not include a member corresponding to a particular job, the JCL library reference from the GLOBAL file 410 is instead used for the job.

Figure 7A:
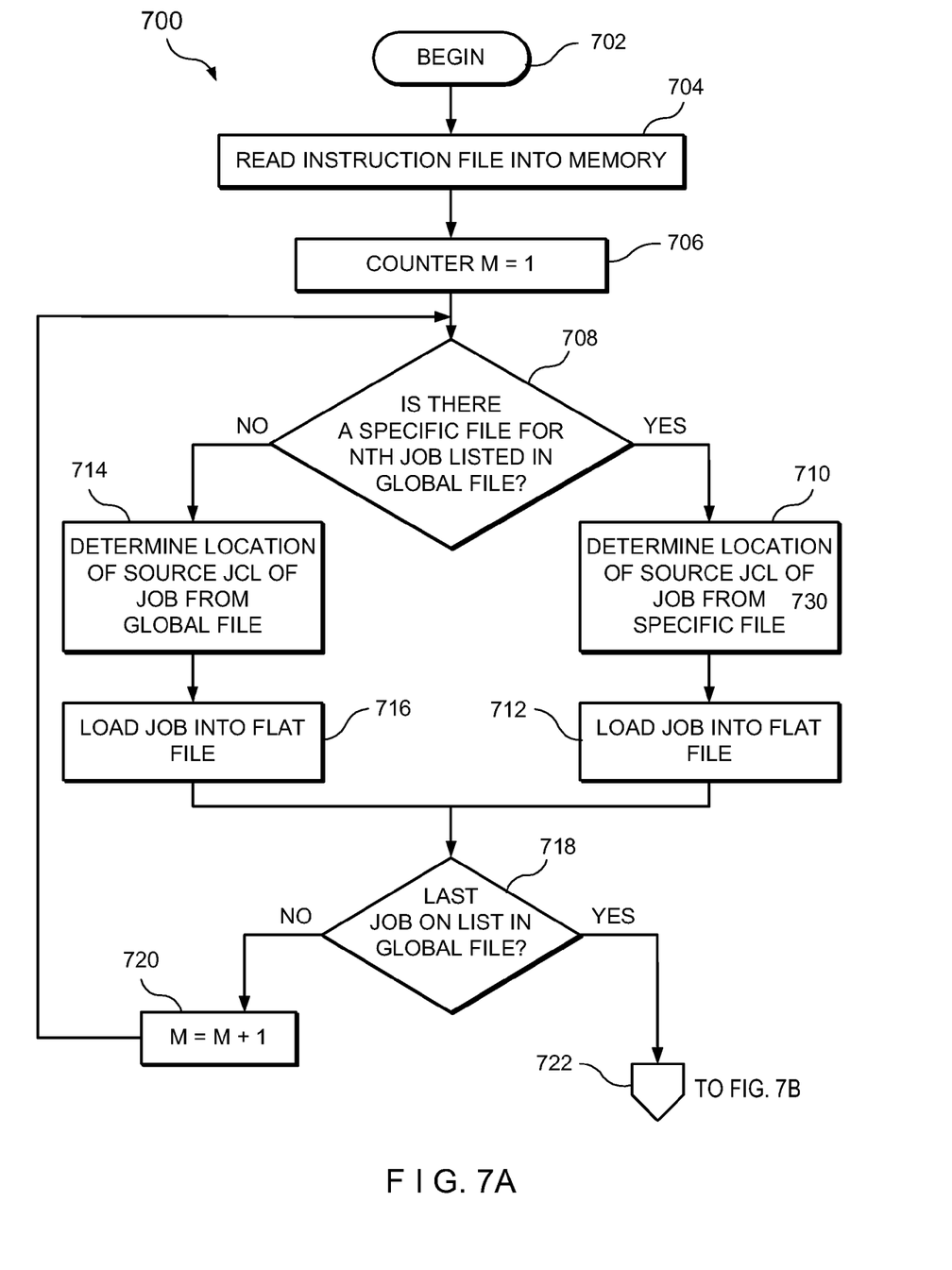
FIG. 7A is a flow chart of a method of generating a test JCL file according to an embodiment of the present invention.

Referring now to FIG. 7A, a flow chart of a method 700 of generating a test job control language (JCL) file according to an embodiment of the present invention is shown. The following steps are performed by the JCL generation module 318 unless otherwise stated. In step 702, the method begins. In step 704, the instruction file 406 is read into memory. In embodiments in which the instruction file 406 includes a GLOBAL file 410 and a SPECIFIC file 412, both files 410, 412 are read into memory in step 704. In the following step 706, a job counter (M) which is used to iterate through the list of jobs in GLOBAL file 410 is initially set to one (1). In step 708, it is determined whether SPECIFIC file 412 includes a member corresponding to the Mth job listed in GLOBAL file 410; If so, in step 710 the location of the source JCL of the Mth job is determined from a reference in the SPECIFIC file 412, and the located job is then copied into a file in step 712, e.g., a flat, unformatted file, referred to herein as the J-file, which is an intermediate file that will be converted later to the test JCL; if SPECIFIC file 412 does not include a member corresponding to the Mth job, in step 714 the location of the source JCL of the Mth job is determined from a reference in GLOBAL file 410 and the job is then copied into the J-file in step 716.

Figure 7B:
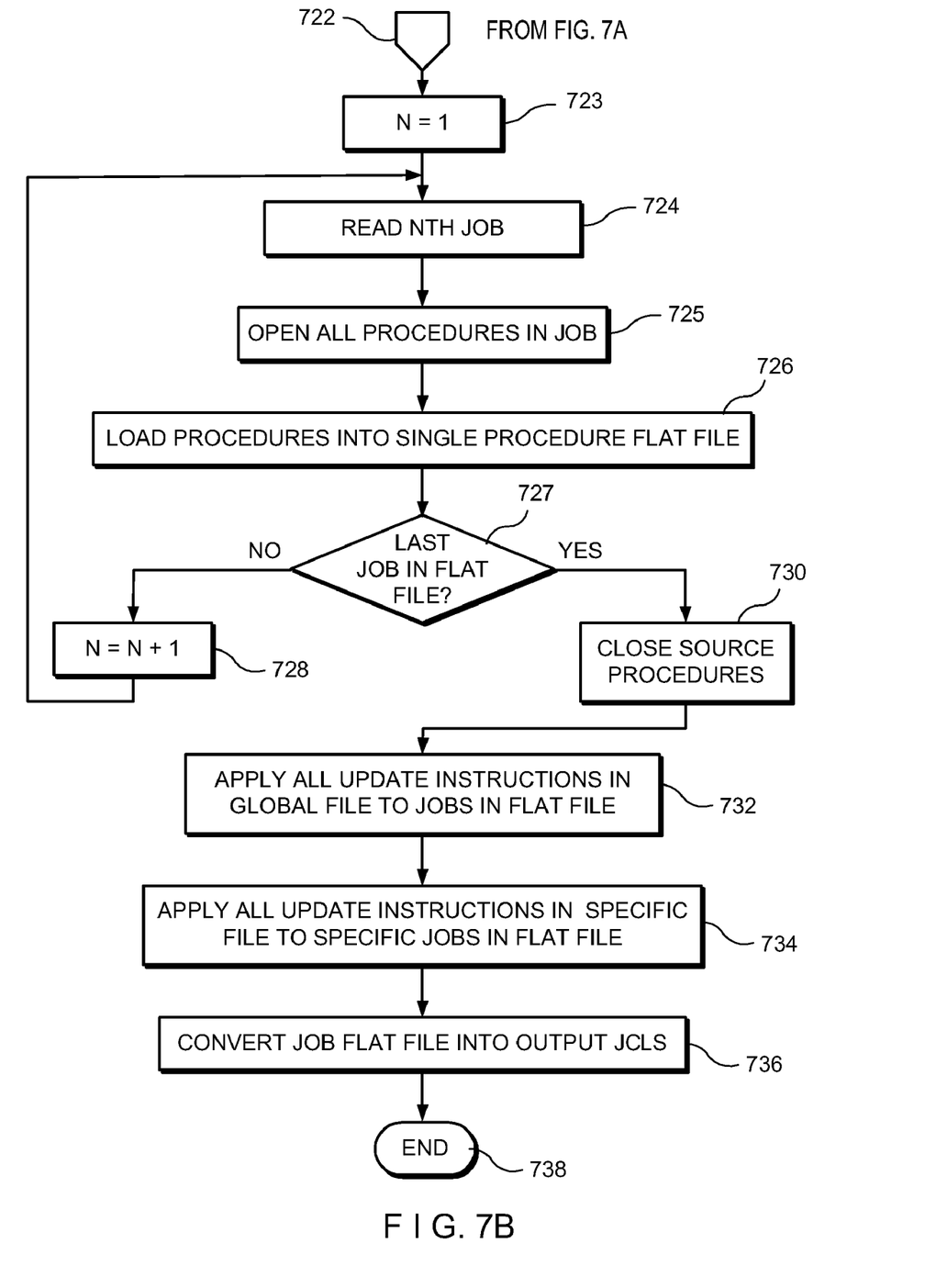
FIG. 7B is a continuation of the flow chart of FIG. 7A.

After either of steps 712 and 716, it is determined whether the Mth job is the last job listed in GLOBAL file 410 in step 718. If not, counter M is incremented in step 720 and the method cycles back to step 708. If it is determined that the Mth job is the last job, the method continues in step 722 (shown in FIG. 7B). When step 722 has been reached, all of the JCL code of the jobs listed in GLOBAL file 410 has been copied into the J-file. Turning now to FIG. 7B, in step 723, a counter (N) is initialized to one (1). In the following step 724, the Nth job listed in the flat file is read, and in step 725 all of the procs listed in the Nth job are opened. In step 726, the opened procs are copied onto another file referred to herein as the P-file. The P-file may also be a flat, unformatted file. If the procs listed in the Nth job are already opened in the P-file, they are not opened again. It is determined in step 727 whether the last job in the J-file has been read; if not, the counter (N) is incremented in step 728 and the method cycles back to step 720; if so, then all of the procs from all the jobs in the J-file 406 have been opened and copied into the P-file. In step 730, the source JCL procs are closed. In this manner, all of the procs are opened only once in one execution thread and then closed, which greatly reduces the processing time for generating the output JCL file 408.

Thereafter, in step 732, the instructions in GLOBAL file 410 are applied to all of the jobs in the J-file using any references required from the procs in the P-file which is efficient to access and scan, and in the following step 734, instructions in SPECIFIC file 412 are applied to selected ones of the jobs in the J-file, again using any references required from the procs in the P-file. The application of instructions from GLOBAL and SPECIFIC files 410, 412 updates references and/or data sets and thereby modifies the JCL code in the J-file. In step 736, the J-file is converted into a test JCL file 408 configured for a particular test scenario. The method ends in step 738.

Figure 9:
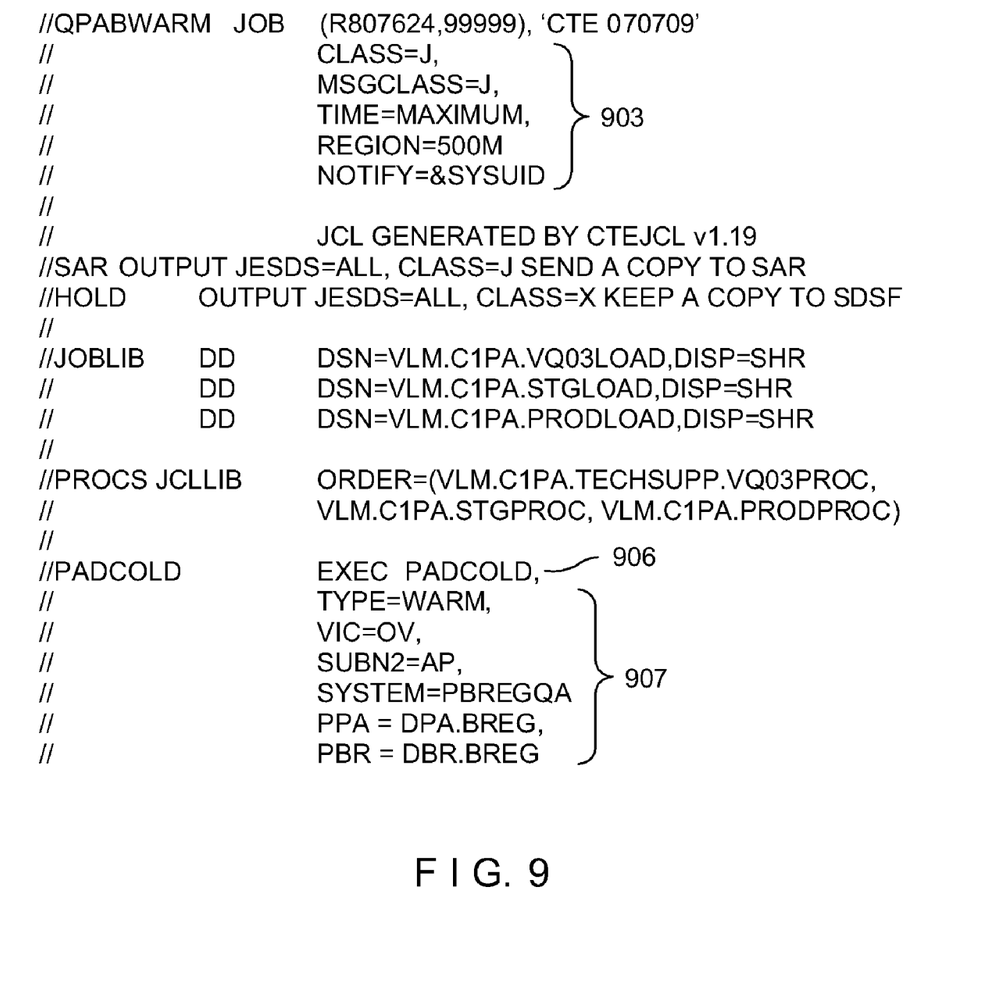
FIG. 9 shows a portion of an output test JCL file generated according to the present invention.

A portion of test JCL file 408 modified based on the source JCL file 402 shown in FIG. 8 is listed in FIG. 9. A comparison of the exemplary source JCL file 402 shown in FIG. 8 and the output JCL file 408 shown in FIG. 9 illustrates how the source JCL file 402 has been modified using the JCL generation module 318 as described above. For example, referring to FIG. 8, in the source JCL file 402, a set of parameters 803 includes a CLASS parameter which is set to "R", while in the corresponding parameters 903 of test JCL file 408, the parameter CLASS parameter is set to "J", which indicates that certain messages are to be transmitted. Similarly, in the source file 402, the procedure call 806 to procedure 'PADCOLD' has associated parameters 807 including TYPE=WARM, VIC=EA, and SYSTEM=PASYSTEM. In contrast, the output JCL file 408 in FIG. 9 includes a procedure call 906 to the same procedure PADCOLD but in which the parameters 907 have changed. For example, TYPE remains WARM, but the parameters VIC and SYSTEM have been changed to VIC=OV and SYSTEM=PBREGQA. The changes between the source JCL file 402 and the test JCL 408 are made to reflect changes in the test environment.

As noted above, one of the main advantages of the present invention is that procs are opened (loaded from memory) only once, rather than each time the procs are encountered. The information within the procs is accessed instead from a single flat file and loaded to memory, which takes much less processing time to read. An additional advantageous aspect of the present invention is that, by delineating global and specific modifications via the GLOBAL and SPECIFIC files 410, 412, further updates of the output JCL file 408 at a later date may be simpler to perform by reviewing, for example, the global overrides in the GLOBAL file 82 which, in the prior art, either could not be performed or was confusing at best.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A system for generating a test job control language (JCL) file, the system comprising:
   a processor;
   a memory device for storing a source JCL file including a plurality of jobs, and instruction files containing instructions for modifying the source JCL file according to a test environment, wherein the instruction files include:
   a global file containing instructions applicable to all jobs in the source JCL file; and
   a specific file containing instructions applicable to one of the plurality of jobs in the source JCL file;
   a JCL generation module executable by the processor and adapted to:
   determine all procedures that are referenced by the plurality of jobs in the stored source JCL file;
   open each unique procedure of the determined procedures once; and
   generate a test JCL file based on the instructions in the instruction files and the opened procedures.

2. The system of claim 1, wherein the JCL generation module:
  copies the plurality of jobs into an intermediate file using the instructions in the instruction files;
  opens each unique procedure based on the intermediate file;
  converts the intermediate file into the test JCL file based on the instructions in the instruction files and the opened procedures.

3. The system of claim 1, wherein the global file includes instructions for substituting at least one reference in the source JCL file with another reference.

4. The system of claim 3, wherein the instructions in the specific file override the instructions in the global file.

5. A system for generating a test job control language (JCL) file, the system comprising:
  a processor;
  a memory device for storing a source JCL file including a plurality of jobs, and instruction files containing instructions for modifying the source JCL file according to a test environment, wherein the instruction files include:
    a global file containing instructions applicable to all jobs in the source JCL file; and
    a specific file containing instructions applicable to one of the plurality of jobs in the source JCL file;
  a JCL generation module executable by the processor and adapted to:
    determine all procedures that are referenced by the plurality of jobs in the stored source JCL file;
    open each unique procedure of the determined procedures once; and
    modify the plurality of jobs in the source JCL based on the instructions in the instruction files and the opened procedures to generate a test JCL file.

6. The system of claim 5, wherein:
  the global file includes instructions for substituting at least one reference in the source JCL file with another reference; and
  the instructions in the specific file override the instructions in the global file.

7. A method for generating a test job control language (JCL) file, the method comprising:
  storing a source JCL file including a plurality of jobs and instruction files containing instructions for modifying the source JCL file according to a test environment, wherein the instruction files include:
    a global file containing instructions applicable to all jobs in the source JCL file; and
    a specific file containing instructions applicable to a selected subset of the plurality of jobs in the source JCL file;
  determining all procedures that are referenced by the plurality of jobs in the stored source JCL file;
  opening each unique procedure of the determined procedures once; and
  modifying the plurality of jobs in the source JCL based on the instructions in the instruction files and the opened procedures to generate a test JCL file.

8. The method of claim 7, further comprising:
  copying the plurality of jobs into an intermediate file using the instructions in the instruction files;
  wherein:
    the step of opening includes opening each unique procedure based on the intermediate file;
    the step of modifying includes converting the intermediate file into the test JCL file based on the instructions in the instruction files and the opened procedures.

9. The method of claim 7, wherein:
  the modifying includes modifying the plurality of jobs in the source JCL based on the instructions in the global file and the specific file.

10. The method of claim 9, wherein the step of determining all procedures that are referenced by the plurality of jobs includes loading the plurality of jobs in the source JCL file onto a separate file and scanning the separate file for procedure references.

11. The method of claim 10, further comprising loading the procedures referenced by the plurality of jobs onto another file.

12. The method of claim 11, wherein the separate file and the another file comprise flat files.

13. A test job control language (JCL) file generation apparatus, comprising:
  a memory;
  a processor disposed in communication with said memory, and configured to issue a plurality of processing instructions stored in the memory, wherein the processor issues instructions to:
    receive a source JCL file including a plurality of jobs and a source procedure file including a library of procedures;
    receive a global instruction file including instructions applicable to the plurality of jobs in the source JCL file and a specific instruction file including instructions applicable to a selected subset of the plurality of jobs in the source JCL file;
    determine all procedures that are referenced by the plurality of jobs in the stored source JCL file;
    access the source procedure file to open each unique procedure of the determined procedures once;
    modify the plurality of jobs in the source JCL based on instructions in the global and specific instruction files, and the opened procedures, wherein the instructions in the specific instruction file override the instructions in the global instruction file; and
    generate a test JCL file in accordance with the modified plurality of jobs.

14. The apparatus of claim 13, wherein the processor issues further instructions to:
  copy the plurality of jobs into an intermediate file using the instructions in the global and specific instruction files;
  open each unique procedure based on the intermediate file;
  convert the intermediate file into the test JCL file based on the instructions in the instruction files and the opened procedures.

15. The apparatus of claim 13, wherein the global instruction file includes instructions for substituting at least one reference in the source JCL file with another reference.

16. The apparatus of claim 13, the instructions to determine all procedures that are referenced by the plurality of jobs includes instructions to load the plurality of jobs in the source JCL file onto a separate file and scan the separate file for procedure references.

17. The apparatus of claim 16, further comprising instructions to load the procedures referenced by the plurality of jobs onto another file.

18. The apparatus of claim 17, wherein the separate file and the another file comprise flat files.

19. A test job control language (JCL) file generation processor-readable medium, storing processor issuable instructions to:
  receive a source JCL file including a plurality of jobs and a source procedure file including a library of procedures;

receive a global instruction file including instructions applicable to the plurality of jobs in the source JCL file and a specific instruction file including instructions applicable to a selected subset of the plurality of jobs in the source JCL file;

determine all procedures that are referenced by the plurality of jobs in the stored source JCL file;

access the source procedure file to open each unique procedure of the determined procedures once;

modify the plurality of jobs in the source JCL based on instructions in the global and specific instruction files, and the opened procedures, wherein the instructions in the specific instruction file override the instructions in the global instruction file; and generate a test JCL file in accordance with the modified plurality of jobs.

20. The medium of claim 19, wherein the processor issues further instructions to:

copy the plurality of jobs into an intermediate file using the instructions in the global and specific instruction files;

open each unique procedure based on the intermediate file;

convert the intermediate file into the test JCL file based on the instructions in the instruction files and the opened procedures.

21. The medium of claim 19, wherein the global instruction file includes instructions for substituting at least one reference in the source JCL file with another reference.

22. The medium of claim 9, the instructions to determine all procedures that are referenced by the plurality of jobs includes instructions to load the plurality of jobs in the source JCL file onto a separate file and scan the separate file for procedure references.

23. The medium of claim 22, further comprising instructions to load the procedures referenced by the plurality of jobs onto another file.

24. The medium of claim 23, wherein the separate file and the another file comprise flat files.

* * * * *